(No Model.)
J. S. HALL.
OIL FILTER.
No. 483,148. Patented Sept. 27, 1892.
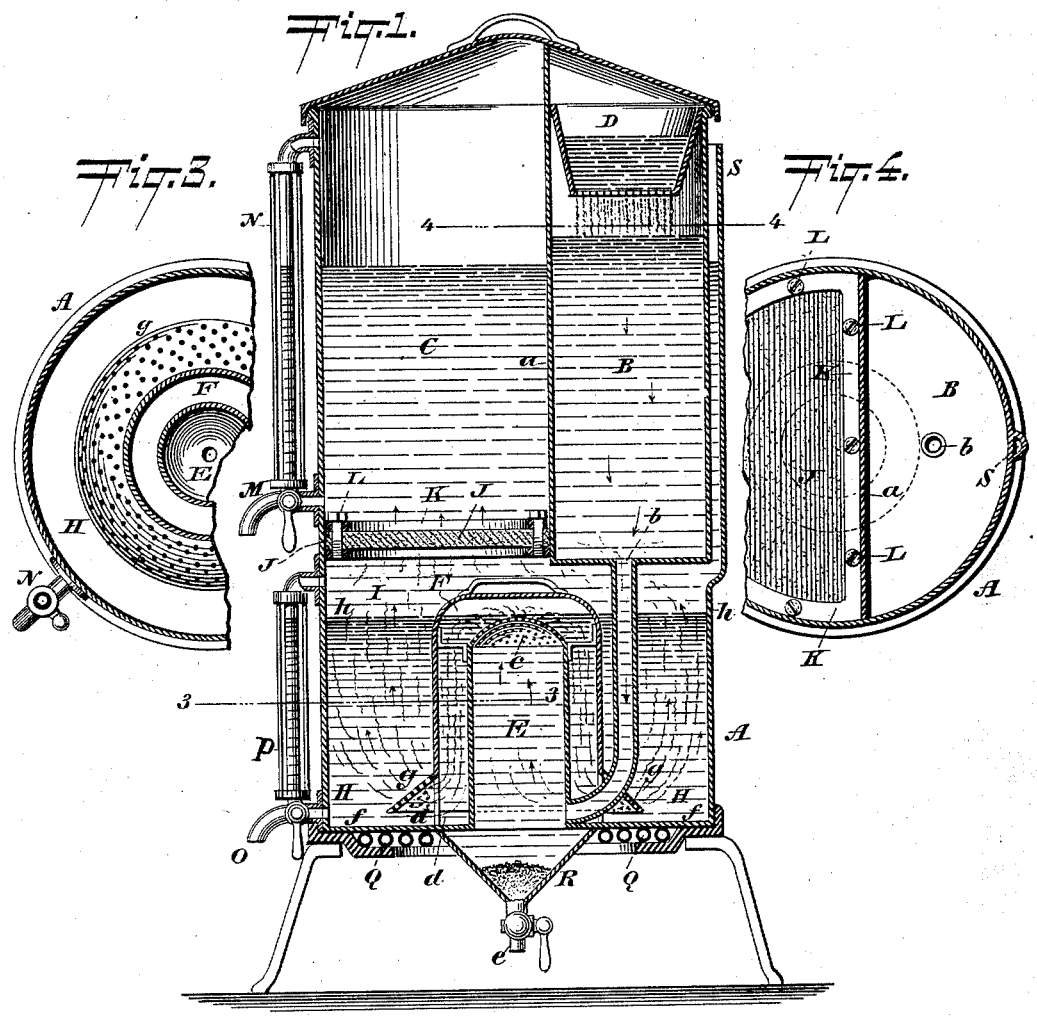
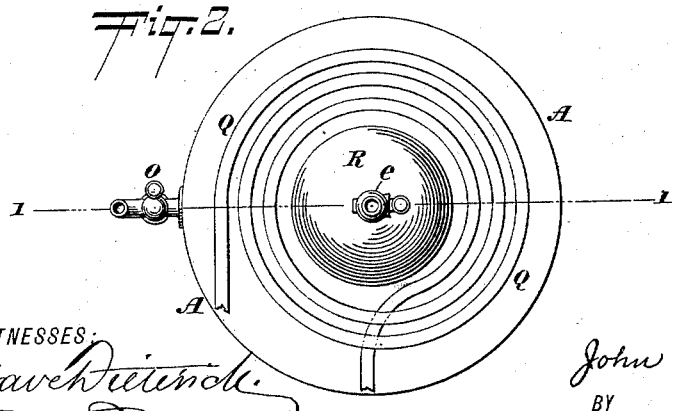
WITNESSES:
Gustave Dieterich
Henry E. Everding
INVENTOR
John S. Hall
BY
Briesen & Knauth
his ATTORNEYS

UNITED STATES PATENT OFFICE.

JOHN S. HALL, OF NEW YORK, N. Y.

OIL-FILTER.

SPECIFICATION forming part of Letters Patent No. 483,148, dated September 27, 1892.

Application filed June 26, 1891. Renewed August 12, 1892. Serial No. 442,848. (No model.)

*To all whom it may concern:*

Be it known that I, JOHN S. HALL, a resident of the city, county, and State of New York, have invented an Improvement in Apparatus for Filtering Oil, of which the following is a specification.

My invention relates to certain improvements in oil purifiers and filters; and it consists, mainly, in an apparatus embodying means for passing impure oil first through successive chambers containing water or analogous purifying fluid and then through a filter proper situated above the level of the water.

It also consists in the novel arrangement and combination of parts hereinafter more fully described.

In the drawings, Figure 1 is a vertical section on the line 1 1 of Fig. 2 of my improved apparatus; Fig. 2, a bottom view of the same; Fig. 3, a horizontal section taken on line 3 3, Fig. 1; Fig. 4, a horizontal section on line 4 4, Fig. 1.

A is the main tank. The upper part of this tank is separated into two chambers B and C by a partition $a$. At the upper part of the chamber B, which is the impure-oil chamber, is suspended or placed a strainer D, into which the impure or crude oil is poured and from which the oil, strained of its grosser impurities, flows into the lower part of the chamber B. At the lower end of the chamber B is an outlet-pipe $b$, through which the strained oil flows downward into the lower end of a dome-shaped chamber E, which at its upper end has a rose or strainer $c$, while its lower end is open and located above the open upper end of a sediment-collector R. A second dome-shaped chamber F, which is closed on top and open at the bottom, is placed at some distance over the dome E. It is held at a distance from the bottom $f$ of the water-chamber H by legs $d$; but, if desired, the plate $g$ may be brought clear down upon the bottom $f$, in which case the legs $d$ become superfluous. The lower wall of the dome F flares outward, as at $g$, and is perforated, as shown, to help divide the ascending oil into fine and separated jets. The lower portion of the tank A forms the water-chamber H, which is in open communication with the chambers E and F and filled to a predetermined height $h$ $h$ with water.

Above the water-line $h$ $h$ is placed between the chambers C and H a partition J, which is composed of suitable filtering material, such as asbestus, porous clay, or fibrous material of approved construction. The filter-plate J is preferably held by rings K, bolted or fastened together, as shown in Fig. 1 of the drawings, so that when the bolts L are tightened the filter-plate is pressed firmly against the walls of the chamber C. It will be noticed that this filter J is placed above the water-line $h$ $h$, and that therefore only the oil comes into contact with the filter proper. The advantage of this construction is obvious, for the pores of the filter will not be filled with oil-repellant fluids nor with slimy impurities which the water is apt to carry. From the lower part of the chamber C (but above the filter J) extends a faucet M to draw off the pure and filtered oil. N is a gage to show the height or amount of said oil in the chamber C. The chamber H has, also, a faucet O to draw off the impure fluid and a gage P to ascertain the height of the water. The receptacle R is also provided with a faucet $e$ to draw off the sediment. Beneath the water-vessel H are steam-pipes Q, which furnish the necessary amount of heat.

In operation the chambers H, E, F, and R are first filled to the line $h$ $h$, or thereabout, with water. Impure oil is then poured into the strainer D and strained into the chamber B, passing thence through the oilway $b$ into the lower part of the dome E, thence through the rose $c$ into the upper part of the dome F, and thence out into the chamber H through the perforated plate $g$, and thence up through the water within the chamber H. The heat from the steam-pipes Q materially facilitates the flow of the oil and the delivery of its impurities to the water. An air-vent S allows the escape of bubbles of air set free when the liquid is heated. The oil, having been fairly purified in its passage through the water, then rests on top of the water and finally rises through the filter J into the chamber C, from which it can be withdrawn from time to time.

Having now described my invention, what I claim is—

In an apparatus for purifying and filtering oil, the combination of the receiving-chamber B, oilway $b$, and purifying-chamber E, having perforated top and closed bottom, dome F, having closed top and open bottom and flaring lower edge $g$, and the washing-chamber H, with the pure-oil chamber C, filter-plate J, and partition $a$, said partition $a$ separating the chambers B and C, the pipe $b$ entering the lower part of the chamber E, substantially as and for the purposes specified.

JOHN S. HALL.

Witnesses:
HARRY M. TURK,
HENRY E. EVERDING.